United States Patent
Dai et al.

(10) Patent No.: US 12,076,748 B2
(45) Date of Patent: Sep. 3, 2024

(54) SLIPPERY ROUGH SURFACES

(71) Applicant: THE PENN STATE RESEARCH FOUNDATION, University Park, PA (US)

(72) Inventors: Xianming Dai, University Park, PA (US); Birgitt M. Boschitsch, University Park, PA (US); Jing Wang, University Park, PA (US); Tak-Sing Wong, University Park, PA (US); Nan Sun, University Park, PA (US)

(73) Assignee: THE PENN STATE RESEARCH FOUNDATION, University Park (PA)

( * ) Notice: Subject to any disclaimer, the term of this patent is extended or adjusted under 35 U.S.C. 154(b) by 801 days.

(21) Appl. No.: 16/551,895

(22) Filed: Aug. 27, 2019

(65) Prior Publication Data

US 2019/0381534 A1    Dec. 19, 2019

Related U.S. Application Data

(63) Continuation of application No. 15/568,639, filed as application No. PCT/US2016/028959 on Apr. 22, 2016, now Pat. No. 10,434,542.

(Continued)

(51) Int. Cl.
*B05D 5/08* (2006.01)
*B05D 3/00* (2006.01)
(Continued)

(52) U.S. Cl.
CPC ............ *B05D 5/08* (2013.01); *B05D 3/00* (2013.01); *B05D 5/02* (2013.01); *B08B 17/065* (2013.01);
(Continued)

(58) Field of Classification Search
CPC . B05D 3/00; B05D 3/101; B05D 5/02; B05D 5/08; B08B 17/065;
(Continued)

(56) References Cited

U.S. PATENT DOCUMENTS

| 2007/0009709 | A1* | 1/2007 | Krishnan | ............... B08B 17/06 428/141 |
| 2010/0028604 | A1* | 2/2010 | Bhushan | ............... B32B 27/08 977/890 |

(Continued)

FOREIGN PATENT DOCUMENTS

| WO | 2012/100099 A2 | 7/2012 |
| WO | 2012/100100 A2 | 7/2012 |

(Continued)

OTHER PUBLICATIONS

International Search Report issued in corresponding International Application No. PCT/US2016/028959 dated Jul. 27, 2016.
(Continued)

*Primary Examiner* — Duy Vu N Deo
*Assistant Examiner* — Christopher Remavege
(74) *Attorney, Agent, or Firm* — DINSMORE & SHOHL LLP

(57) ABSTRACT

Substrates having a textured surface that can maintain or improve droplet mobility in both the Cassie and Wenzel states include a textured surface and a conformal lubricant layer thereover. The textured surface can include a plurality of raised first elements and a plurality of second elements thereon and the conformal lubricant layer over the plurality of raised first elements and covering the plurality of second elements. The plurality of raised first elements can have an average height of between 0.5 μm and 500 μm, and the plurality of second elements can have an average height of between 0.01 μm and 10 μm. Such substrates can be pre- (Continued)

pared by texturing a surface of a substrate with a plurality of raised first elements and a plurality of second elements thereon; optionally silanizing the textured surface and applying a lubricant layer over the plurality of raised first elements and between the plurality of second elements.

10 Claims, 8 Drawing Sheets

Related U.S. Application Data

(60) Provisional application No. 62/152,532, filed on Apr. 24, 2015.

(51) Int. Cl.
*B05D 3/10* (2006.01)
*B05D 5/02* (2006.01)
*B08B 17/06* (2006.01)
*B29C 59/02* (2006.01)
*B32B 3/30* (2006.01)

(52) U.S. Cl.
CPC .............. *B29C 59/022* (2013.01); *B32B 3/30* (2013.01); *B05D 3/101* (2013.01); *B29C 2059/023* (2013.01); *B29K 2995/0092* (2013.01); *B29K 2995/0093* (2013.01)

(58) Field of Classification Search
CPC ............ B29C 2059/023; B29C 59/022; B29K 2995/0092; B29K 2995/0093; B32B 3/30
See application file for complete search history.

(56) References Cited

U.S. PATENT DOCUMENTS

| | | | |
|---|---|---|---|
| 2011/0157277 A1* | 6/2011 | Zhao | B41J 2/162 347/44 |
| 2011/0192521 A1* | 8/2011 | Ducros | C23C 14/28 156/60 |
| 2011/0311764 A1 | 12/2011 | Hulseman et al. | |
| 2012/0052241 A1* | 3/2012 | King | B08B 17/06 264/293 |
| 2012/0107556 A1 | 5/2012 | Zhang et al. | |
| 2013/0142994 A1* | 6/2013 | Wang | C03C 17/22 427/595 |
| 2013/0220813 A1* | 8/2013 | Anand | B08B 17/065 427/256 |
| 2013/0251948 A1* | 9/2013 | Lyons | B05D 5/00 427/180 |
| 2013/0330501 A1* | 12/2013 | Aizenberg | B81C 1/00349 428/116 |
| 2014/0290731 A1* | 10/2014 | Aizenberg | A61L 15/46 427/299 |
| 2014/0314975 A1* | 10/2014 | Smith | B05C 7/00 428/141 |
| 2015/0174625 A1* | 6/2015 | Hart | B08B 17/065 428/141 |
| 2015/0175814 A1* | 6/2015 | Aizenberg | C09D 5/1693 427/2.24 |
| 2015/0273518 A1* | 10/2015 | Varanasi | B05D 5/08 427/372.2 |
| 2015/0273522 A1* | 10/2015 | Boscher | B05D 5/08 428/141 |
| 2015/0314554 A1* | 11/2015 | Fujiwara | B29C 71/04 428/142 |
| 2016/0074915 A1* | 3/2016 | White | B05D 1/60 427/551 |
| 2016/0169867 A1* | 6/2016 | Khine | G01N 33/68 73/61.71 |
| 2017/0095242 A1* | 4/2017 | Milbocker | A61B 17/0218 |
| 2017/0121624 A1* | 5/2017 | Wang | C10M 173/00 |
| 2017/0282416 A1* | 10/2017 | Kim | B29C 59/005 |
| 2017/0333941 A1* | 11/2017 | Park | B05D 5/08 |

FOREIGN PATENT DOCUMENTS

| | | |
|---|---|---|
| WO | 2013/022467 A2 | 2/2013 |
| WO | 2013/115868 A2 | 8/2013 |
| WO | 2014/012052 A1 | 1/2014 |
| WO | 2014/012072 A2 | 1/2014 |
| WO | 2014/012078 A2 | 1/2014 |
| WO | 2014/012079 A1 | 1/2014 |
| WO | 2014/145414 A1 | 9/2014 |

OTHER PUBLICATIONS

Kim et al., "Hierarchical or Not? Effect of the Length Scale and Hierarchy of the Surface Roughness on Omniphobicity of Lubricant-infused Substrates", Nano Letters, 2013:13:1793-99.

Anand, S. et al., "Enhanced condensation on lubricant-impregnated nanotextured surfaces", ACS Nano. 2012, vol. 6, No. 11, abstract, pp. 10122, 10124, 10128.

Solomon, BR et al., "Drag reduction using lubricant-impregnated surfaces in viscous laminar flow", Langmuir 2014, vol. 30, No. 36, pp. 10970-10976.

Notice of Allowance issued in corresponding U.S. Appl. No. 15/568,639 mailed Jun. 13, 2019.

Final Office Action issued in corresponding U.S. Appl. No. 15/568,639 mailed Dec. 20, 2018.

Office Action issued in corresponding U.S. Appl. No. 15/568,639 mailed Dec. 20, 2018.

* cited by examiner

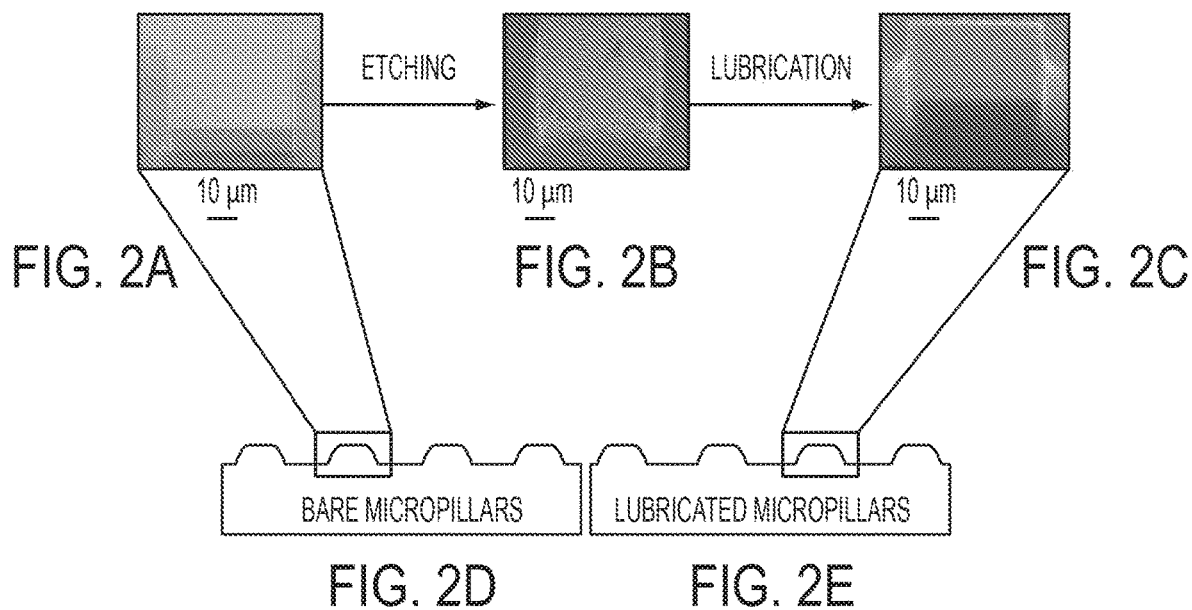
FIG. 2A  FIG. 2B  FIG. 2C
FIG. 2D  FIG. 2E
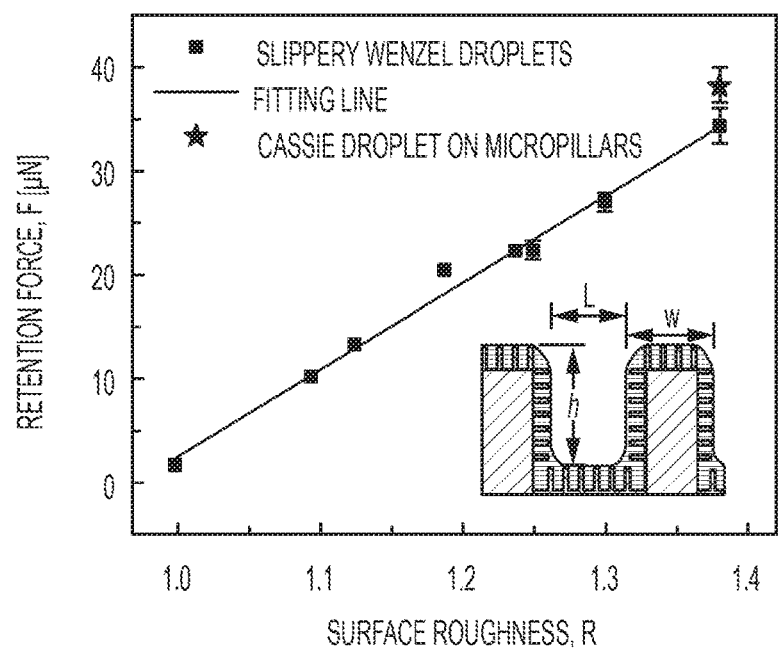
FIG. 2F

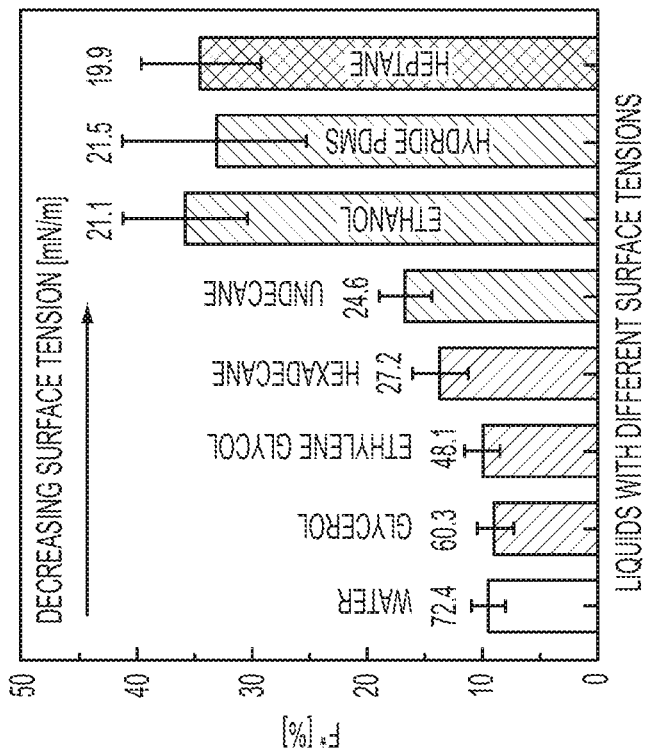
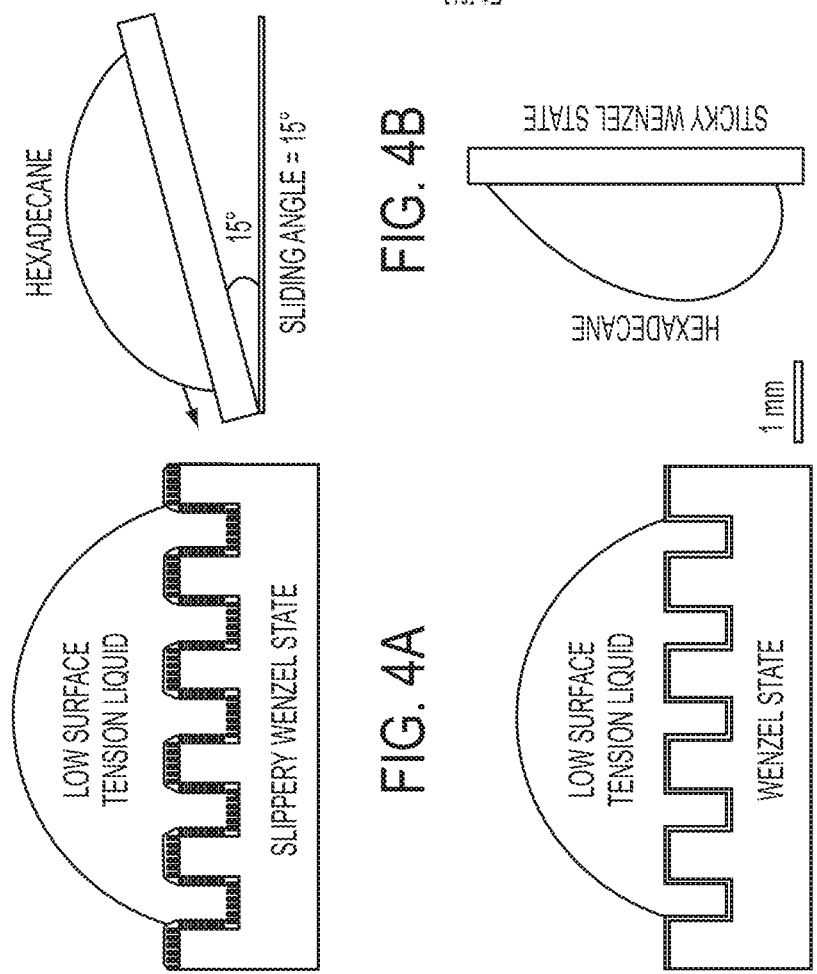
FIG. 4A FIG. 4B FIG. 4C FIG. 4D FIG. 4E

SLIPPERY ROUGH SURFACES

CROSS REFERENCE

This application is a Continuation Application of U.S. patent application Ser. No. 15/538,639 filed Oct. 23, 2017, now allowed, which is the U.S. National Phase under 35 U.S.C. § 371 of International Application No. PCT/US2016/028959 filed on Apr. 22, 2016, which claims the benefit of U.S. Provisional Application No. 62/152,532 filed on Apr. 24, 2015, the entire contents of each are hereby incorporated by reference.

STATEMENT REGARDING FEDERALLY SPONSORED RESEARCH

This invention was made with government support under Contract No. N00014-12-1-0962, awarded by the Office of Naval Research, under Contract No. CMMI1351462 awarded by the National Science Foundation, NSF Graduate Research Fellowship (Grant No. DGE1255832), and under Grant No. DE-AR0000326, awarded by the Department of Energy. The Government has certain rights in the invention.

TECHNICAL FIELD

The present disclosure relates to substrates having a textured surface and a conformal lubricant layer thereover which can be used for fog harvesting, dropwise condensation, oil adsorption, oil/water separation, drag reduction, anti-fouling and anti-biofouling, anti-frosting and anti-icing devices and applications.

BACKGROUND

Enhancing the mobility of liquid droplets on rough surfaces is of great interest in industry. Applications range from condensation heat transfer to water harvesting to the prevention of icing and frosting. The mobility of a liquid droplet on a rough solid surface has long been associated with its wetting state. When liquid drops are sitting on the tips of solid textures and air is trapped underneath, they are in the Cassie state. When the drops are impregnated within the solid textures, they are in the Wenzel state. The Cassie state has been associated with high droplet mobility, while the Wenzel state has been associated with droplet pinning.

Many plants, insects, and animals have highly liquid repellent surfaces, with well-known examples including lotus leaves, the legs of water striders, and the feet of tokay geckos. The liquid repellent function of these natural surfaces is attributed to the presence of hydrophobic hierarchical micro- and nanoscale surface textures that maintain liquid droplets in the Cassie state. Surface textures yielding Cassie state droplets are surfaces with superhydrophobic or superomniphobic properties, with a typical liquid contact angle over 150° and contact angle hysteresis less than 10°. Liquids on these surfaces can roll off with minimal tilting owing to the reduced liquid-solid contact area. Inspired by these natural surfaces, a range of engineered superhydrophobic or superomniphobic surfaces have been developed over the last decade with technological applications ranging from self-cleaning surfaces to drag reduction coatings.

Liquid droplets on rough surfaces typically exhibit Cassie state, Wenzel state, or a combination of these two states. It is often desirable to maintain high liquid repellency in industrial applications, such as fog harvesting, dropwise condensation, and anti-icing. Because the conventional Wenzel state has long been associated with droplet pinning, intense research has focused on maintaining liquid droplets in the Cassie state. Sustaining a droplet in this state is difficult under certain conditions, however, as the air layer underneath the droplets can be disrupted when subjected to high pressure or high temperature, or when encountering liquids with impurities or low surface tensions. Once the air layer is depleted, the liquid will impregnate the solid textures. As a result, the liquid strongly adheres to the solid surface due to the increased contact area of the liquid-solid interfaces and liquid pinning at defects in the solid substrate.

Once a droplet is in the conventional Wenzel state on a roughened surface, it becomes immobile. In an effort to recover droplet mobility, previous researches have been predominantly focused on the ways to induce Wenzel-to-Cassie transition. Thus far, very few design strategies can restore the liquid from the fully impregnated Wenzel state to the Cassie state, and strategies successful in doing so require the use of external energy.

Several publications disclose slippery liquid-infused porous surfaces (SLIPS) to repel liquids. See, e.g., WO2012100099, WO2012100100, WO2013115868 to Aizenberg et al. Other publications disclose methods and compositions related to liquid repellant surfaces having selective wetting and transport properties. See, e.g., WO2014012078, WO2014012079 to Aizenberg et al. Additional references disclose liquid-impregnated surfaces with non-wetting properties. See, e.g., WO2013022467, WO2014145414 to Smith et al. and Kim et al., Hierarchical or Not? Effect of the length Scale and Hierarchy of the Surface Roughness on Omnbiphobicity of Lubricant-infused Substrates, Nano Letters, 2013:13:1793-99.

However, there is a continuing need for technology that provides a simple solution to maintain droplet mobility without requiring challenging transitions, and for new liquid-repellent surface designs.

SUMMARY OF THE DISCLOSURE

An advantage of the present disclosure is a surface design that can maintain droplet mobility in both the Cassie and Wenzel states. Such slippery rough surfaces advantageously have a high surface area and slippery interface and can be used in fog harvesting, dropwise condensation, oil adsorption, oil/water separation, drag reduction, anti-fouling and anti-biofouling, and anti-icing/frosting devices and applications.

These and other advantages are satisfied, at least in part, by a textured surface that can maintain droplet mobility in both the Cassie and Wenzel states. The textured surface can include a plurality of raised first elements and a plurality of second elements thereon and a conformal lubricant layer over the plurality of raised first elements and covering the plurality of second elements. Advantageously, the conformal lubricant layer can have a uniform thickness over the plurality of raised first elements since the thickness is governed by the height of the second elements.

In some embodiments, the plurality of raised first elements can have an average height of between 0.5 μm and 500 μm, and the plurality of second elements can have an average height of between 0.01 μm and 10 μm. In other embodiments, the substrate can include a silanized coating between the conformal lubricant layer and either the plurality of raised first elements or the plurality of second elements or both. In still further embodiments, the lubricant can be one or more of an oleophobic lubricant, an oleophilic lubricant, a hydrophobic lubricant and/or a hydrophilic lubricant.

Another aspect of the present disclosure includes a method of preparing a slippery rough surface. The method comprises texturing a surface of a substrate with a plurality of raised first elements and a plurality of second elements thereon; and applying a lubricant layer over the plurality of raised first elements and between the plurality of second elements. Advantageously, the lubricant layer can be applied to form a conformal lubricant layer over the plurality of raised first elements. The method can advantageously be applied to surfaces of the substrates that are metals, plastics, ceramics, glass or combinations thereof. In some embodiments, the method includes silanizing the textured surface prior to applying the lubricant layer.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIGS. 1a-c show a method including texturing a surface of a substrate with a plurality of raised first elements and a plurality of second elements thereon; silanizing the textured surface; and applying a lubricant layer over the plurality of raised first elements and fully covering the plurality of second elements. FIG. 1d shows a Cassie state droplet on a slippery rough surfaces (w=50 μm, L=50 μm, h=50 μm) according to an embodiment of the present disclosure. The bright area between the droplet and solid surface indicates the existence of a gas layer, e.g., air. The sliding angle is 8°. FIG. 1e shows a Wenzel state droplet on the slippery rough surface (w=47 μm, L=53 μm, h=19 μm) according to an embodiment of the present disclosure with the sliding angle of 18°. No gas layer exists between the water droplet and solid surface. The drop volumes are 10 μL and all images share the same scale bar.

FIGS. 2a-2f are characterizations of surface retention force of water droplets on lubricated and non-lubricated rough surfaces. Note that lubricated rough surface is equivalent to slippery rough surface. FIG. 2a shows an SEM image of a silicon micropillar; FIG. 2b shows an SEM image of a nanotextured micropillar. Nanostructures were formed at the top and side walls of the micropillar and the bottom of the substrate by a wet etching process. FIG. 2c shows an ESEM image of a lubricated micropillar. The lubricant (Krytox 101) was retained within the nanotextures and the lubricated micropillars exhibit flat surface topography similar to that of the silanized micropillar without nanotextures. FIG. 2d is a cross section of bare micropillars, and FIG. 2e is a cross section of lubricated micropillars (w=47 μm, L=53 μm, h=19 μm; solid fraction=0.22). FIG. 2f is a chart plotting the retention force F of liquid droplets on lubricated rough surfaces over surface roughness R (R is defined as the ratio of the actual surface area of the elements and the projected area). The coefficient of determination is 0.996 for the linear fit curve depicted here. Error bars indicate standard deviations from three independent measurements.

FIGS. 4a-4e show aqueous and organic liquid droplets in the Wenzel state on lubricated and non-lubricated rough surfaces. Note that lubricated rough surface is equivalent to slippery rough surface. FIG. 4a is schematic of a drop with low surface tension in Wenzel state on a lubricated rough surface, showing a low contact angle. FIG. 4b shows a 10 μL droplet of hexadecane on the lubricated rough surfaces, displaying a sliding angle of 15°. FIG. 4c is a schematic of a drop with low surface tension on silanized micropillars, showing a low contact angle in Wenzel state. FIG. 4d shows a 10 μL droplet of hexadecane on microstructured surfaces with a tilt angle of 90°. The drop is strongly pinned on the surface, exhibiting the sticky Wenzel state. FIG. 4e show normalized retention force F* of liquids with different surface tensions on lubricated rough surfaces. The value for F* was defined as the ratio of the retention force on the lubricated surfaces to that of the non-lubricated surfaces. Here, R=1.36. The micropillar dimension in this figure is: w=47 μm, L=53 μm, h=19 μm. FIGS. 4b and 4d share the same scale bar. Error bars indicate standard deviations from three independent measurements.

FIG. 6a shows patterned nanotextured micropillars; FIG. 6b shows nanotextures on top and side walls of a micropillar; FIG. 6c is a top view of the nanotextures; FIG. 6d is a cross section of nanotextured micropillars.

FIG. 7a is a cross section of the lubricated micropillars. The nanotextures were submerged in lubricants. FIG. 7b, c, d show ESEM image of the lubricant distribution: spin speed 3000, 5000 and 12000 rpm. The spin time is 60 seconds. Notice that at spin speeds higher than 8000 rpm, the lubricant uniformly covers the nanotextures, yielding a slippery rough surface. Depending on the viscosity of the lubricant, the spin speed and speed duration will be adjusted accordingly.

FIG. 8a has a Krytox 101 infused nanotextured plain surface. FIGS. 8b-f show wetting on Krytox 101 lubricated micropillars at different spin speeds. 10 μL water droplets were used in the measurements. The non-lubricated micropillar dimensions are: w=47 µm, L=53 µm, h=19 µm.

FIG. 10a shows lubrication with Krytox 101 and FIG. 10b shows lubrication with mineral oil. Error bars represent the measurement error for a single water droplet.

FIG. 1a plots contact angle hysteresis of water droplet on various lubricants; and FIG. 11b plots experimental contact angle and the prediction of modified Young's equation.

DETAILED DESCRIPTION OF THE DISCLOSURE

Figure 1A:
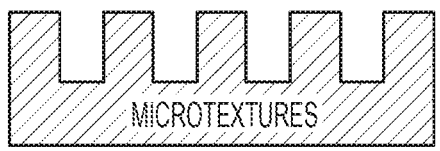
FIGS. 1a-1e illustrate the fabrication of a slippery rough surface and droplets in a Cassie and Wenzel state on such a surface. For example.
Figure 1B:
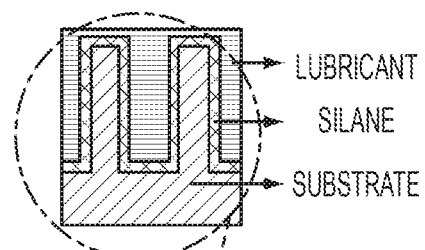
Figure 1B:
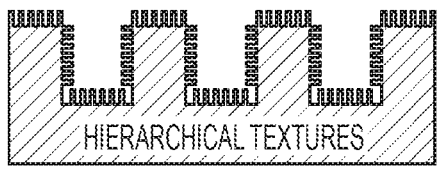

The present disclosure relates to a substrate having a textured surface that can maintain and/or advance droplet mobility in both the Cassie and Wenzel states, e.g., a slippery rough surface (SRS). Advantageously, the textured surface includes a plurality of raised first elements and a plurality of second elements thereon and a conformal lubricant layer over the plurality of raised first elements and covering the plurality of second elements, e.g. between and fully covering the plurality of second elements. The plurality of raised first elements have an average height of between 0.5 µm and 500 µm, e.g., an average height of between 15 µm and 100 µm. The plurality of second elements have an average height of between 0.01 µm and 10 µm, e.g., an average height of between 0.5 µm and 5 µm. For example, the surface roughness R is between 1 and 1.4 in FIG. 2f.

The substrate can further comprise a silanized coating between the conformal lubricant layer and either the plurality of raised first elements or the plurality of second elements or both. As used herein silanization means to contact the surface of the substrate with at least one reactive silane to chemically react the surface of the substrate and thus bind the silane to the substrate surface. A silanized coating results from such silanization. Reactive silanes that can be used for silanization are known in the art and include, for example, heptadecafluoro-1,1,2,2-tetrahydrodecyltrichlorosilane, trimethylchlorosilane, perfluorinated silanes, etc.

In one aspect of the present disclosure, the textured surface includes a plurality of raised elements and a conformal lubricant layer over the plurality of raised elements, wherein the conformal lubricant layer has a uniform thickness over the plurality of raised elements, which have random or regular distributions. In other embodiments, the conformal lubricant layer forms an energetically stable and atomically smooth lubricant layer. The plurality of raised first elements have an average height of between 0.5 µm and 500 µm. The height is determined from the bottom and top of a single structure.

The conformal lubricant layer can be one or more of an oleophobic lubricant, an oleophilic lubricant, a hydrophobic lubricant and/or a hydrophilic lubricant. For example, the conformal lubricant layer can be tertiary perfluoroalkylamines (such as perfluorotri-npentylamine, FC-70 by 3M; perfluorotri-n-butylamine FC-40, etc.), perfluoroalkylsulfides and perfluoroalkylsulfoxides, perfluoroalkylethers, perfluorocycloethers (like FC-77) and perfluoropolyethers (such as KRYTOX family of lubricants by DuPont), perfluoroalkylphosphines, perfluoroalkylphosphineoxides and their mixtures can be used for these applications, as well as their mixtures with perfluorocarbons and any and all members of the classes mentioned. The thickness of the lubricant layer is preferably between 0.01 µm and 10 µm, which is close to the height of the nanotextures in certain embodiments. The uniformity of the lubricant layer over the raised plurality of elements is preferably less than 10 µm.

The lubricant and silanization agent can be matched to a given substrate. For example, perfluorinated oils and perfluorinated silanes can be a combination on the substrate. Hydrophobic combination include, for example, mineral oils, hydrocarbons, and trimethylchlorosilane and hydrophilic combinations include, for example, hydroxyl PDMS and trimethylchlorosilane.

Substrates and textured surfaces that can be used in the present disclosure include those of silicon, metals (e.g., copper, aluminum, steel, titanium etc. and their alloys, e.g., stainless steel, etc.), ceramics (e.g., glass), and polymers or other materials.

Advantageously, substrates having a textured surface, e.g., a slippery rough surface, of the present disclosure can be used in a variety of devices. For example the substrates having a textured surface of the present disclosure can be used in evaporators, condensers, heat exchangers, water and oil collector devices, and drag reduction and anti-biofouling coatings.

The physical origin for the immobility of Wenzel droplets is due to pinning, which results from the interaction of the liquid contact line and micro- and nanoscopic sharp edges of the surface textures. Pinning can be minimized by creating a molecularly smooth surface textures with round edges, but such an idealized rough surface is extremely challenging to manufacture even with the most advanced micro or nanofabrication techniques. A recently created pitcher-plant-inspired, pinning-free surface called slippery liquid-infused porous surfaces (SLIPS) or slippery pre-suffused surfaces directly resembles an idealized smooth surface at the macroscale. SLIPS was designed to create a defect-free, ultra-smooth interface by fully infusing a textured surface with a liquid lubricant overcoat. The overcoat lubricant layer serves as a molecularly smooth surface that minimizes pinning of liquid contact lines.

Figure 1C:
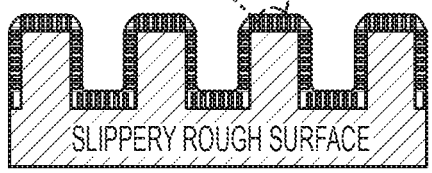
Figure 1D:
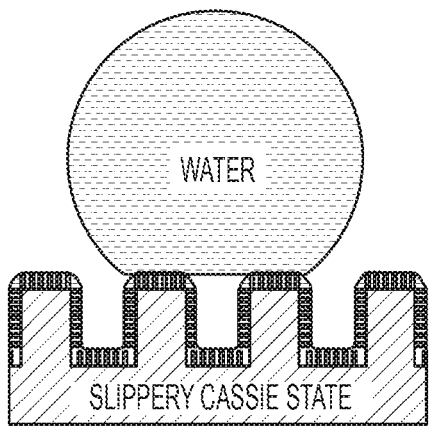
Figure 1D:
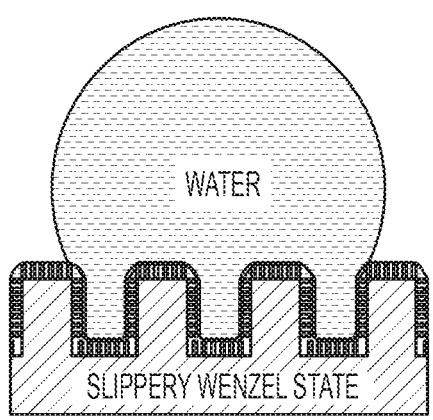
Figure 1D:
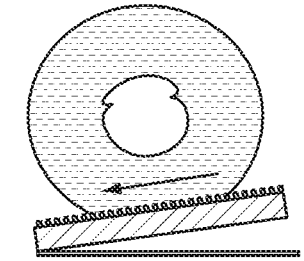
Figure 1E:
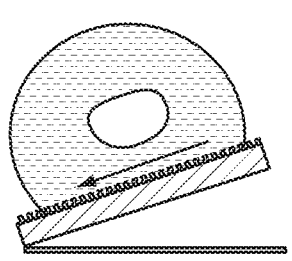
Figure 3:
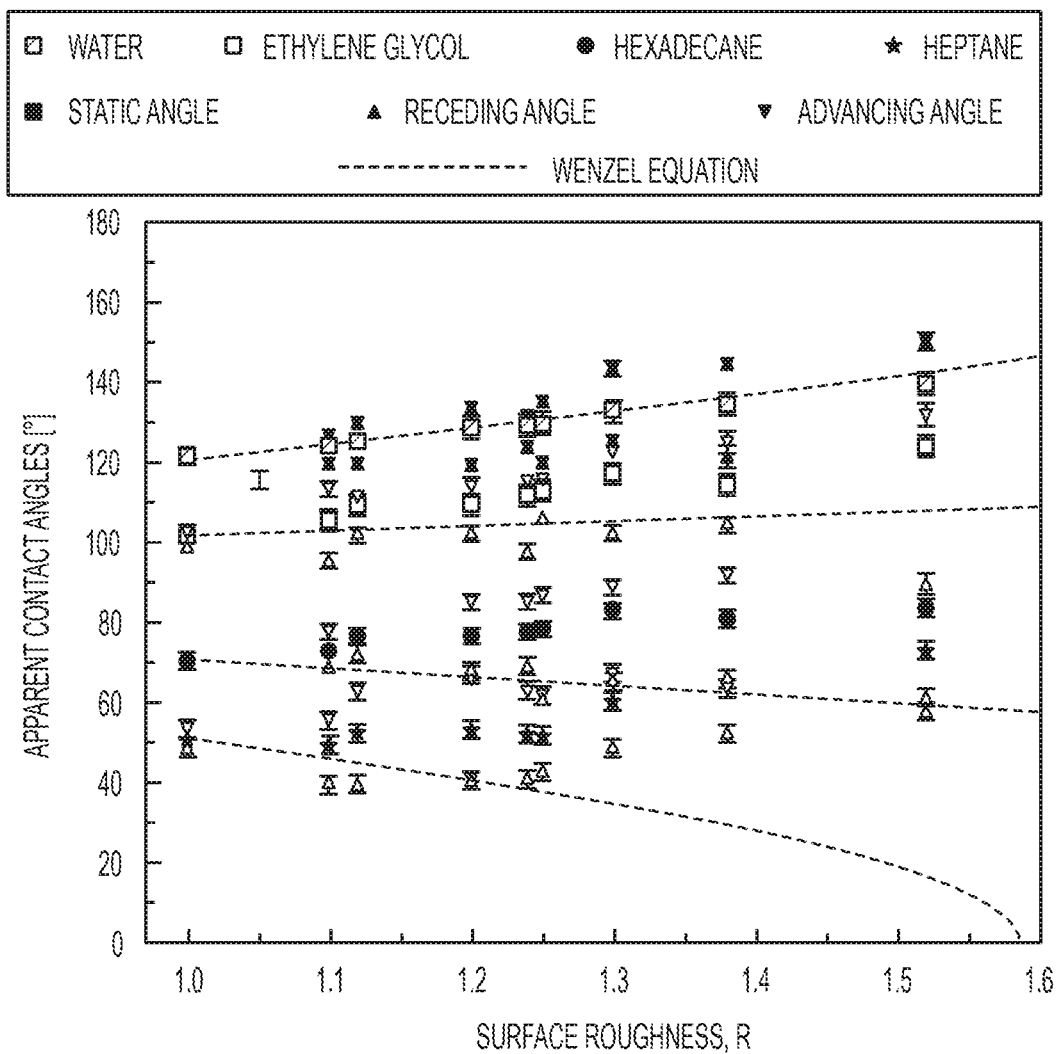
FIG. 3 shows experimentally measured apparent contact angles of various liquid droplets in the Wenzel state as a function of surface roughness of the slippery rough surfaces. It illustrates the wetting characteristics of the slippery rough surfaces. Experimental data includes the apparent static, advancing, and receding angles of different liquids. Error bars represent the standard deviation of at least three data points. Because slippery rough surfaces allow for Wenzel state droplet mobility, and thus lower contact angle hysteresis compared to conventional Wenzel state droplets, we can measure the apparent contact angle with higher accuracy. More accurate experimental measurements allow for more accurate verification of equations predicting apparent contact angle.

In contrast, the slippery rough surfaces in the present disclosure mimic an idealized rough surface. Based on these surfaces, impregnated liquid droplets can show high droplet mobility on hierarchically micro- and nano-textured surfaces in which the nanostructures alone are infused with lubricant (FIG. 1c). We show that by infusing a microscopically-thin conformal layer of lubricant on the surface nanotextures, the sharp edges can be smoothened by the liquid lubricant and the pinning effect can be greatly reduced, leading to enhanced droplet mobility in both Wenzel and Cassie states (FIGS. 1d, 1e).

In practicing the present disclosure, a slippery rough surface can be prepared by texturing a surface of a substrate with a plurality of raised first elements and a plurality of second elements thereon; and applying a lubricant layer over the plurality of raised first elements and fully covering the plurality of second elements. Advantageously, the lubricant can be applied to form a conformal lubricant layer over the plurality of raised first elements and preferably with a uniform thickness. Preferably the thickness of the conformal lubricant layer is between 0.01 µm and 10 µm. In addition, it is preferable that the thickness does not vary over the plurality of raised elements by more than 100%.

To create a slippery rough surface with a thermodynamically stable and conformal lubricant layer, three engineering criteria should be satisfied. First, the rough surfaces should allow the lubricant to stably wet and conformally adhere to the solid textures. Second, it should be energetically more favorable for the lubricant, rather than foreign liquids, to wet the solid textures. Third, the lubricant and foreign liquids should be immiscible.

The first criterion can be satisfied by creating nanoscale textures on micropillars, thus forming hierarchical structures, i.e., a plurality of raised first elements and a plurality of second elements thereon. In order to describe the surface roughness (defined as the ratio of the actual to the projected surface areas) of these dual length scale structures, we define R as the roughness resulting from the micropillars alone, and r as the roughness resulting from nanotextures on the micropillars. The increased surface area due to roughness together with the chemical affinity between the substrate and the lubricant (i.e., the intrinsic contact angle between the lubricant and the substrate is less than 90°) will enhance the wetting of lubricant.

The second criterion can be satisfied by choosing an appropriate solid and lubricant combination for an immiscible foreign fluid such that the following relationships are satisfied:

$$r(\gamma_B \cos\theta_B - \gamma_A \cos\theta_A) - \gamma_{AB} > 0 \text{ and } r(\gamma_B \cos\theta_B - \gamma_A \cos\theta_A) + \gamma_A - \gamma_B > 0, \quad (1)$$

where $\gamma_A$ and $\gamma_B$ are, respectively, the surface tensions for the foreign liquid and for the lubricant; $\gamma_{AB}$ is the interfacial tension between the foreign liquid and lubricant; $\theta_A$ and $\theta_B$ are the equilibrium contact angles for the foreign liquid and the lubricant on a given flat solid surface, respectively. These relationships dictate the solid-lubricant combinations and the required surface roughness to form an energetically stable lubricating film within the nanotextured solid that will not be displaced by the external fluid.

As a demonstration, we chose perfluorinated silanes to functionalize the silicon hierarchical textures and perfluorinated lubricants (i.e., DuPont™ Krytox oils) for the lubrication. Note that perfluorinated lubricants are known to be immiscible to both the aqueous and oil phases, and are hydrophobic in nature. The measured intrinsic contact angle, θ, of water droplets on a smooth slippery surface lubricated with perfluorinated lubricant is 121.1°±1.0°. These solid-lubricant combinations satisfy the relationship outlined by Eq. 1 when specific contacting fluids were used. The height of the silicon nanotextures is 5.1 µm on the top of the micropillars, and 3.8 µm on the side wall. The roughness of the nanotextures, r, was estimated to be 14.6±0.3 on the side of the micropillar and 19.3±0.4 on the top of the micropillar through image analysis of high resolution scanning electron micrographs. The lubricant was applied onto the solid substrate by a spin-coating process, where excess lubricant was removed from the micropillar structures at high spin speed. Due to the dominance of capillary force per unit volume at smaller length scales, the nanotextures will help retain the lubricant more favorably compared to the microscopic roughness. Furthermore, the strong chemical affinity of the silane coatings to the perfluorinated lubricant together with the high roughness of the nanotextures allowed the lubricant to completely infuse the nanotextures and formed a conformal layer over the micropillar structures (see FIGS. 2b and 2c). The surface morphology of the micropillars was smooth with round edges as confirmed by high-resolution electron microscope. The non-lubricated and lubricated micropillars have similar surface morphology based on the cross sectional images (FIGS. 2d and 2e) and ESEM images (FIG. 2c).

We further quantified the surface retention behaviors of water droplets in different wetting states on the lubricated rough surfaces. For a liquid droplet to move on a surface tilted at an angle α, the tangential component of the gravitational force, $F_{gt}$, acting on the droplet has to exceed the surface retention force, F. Specifically, the tangential gravitational force and the surface retention force acting on the droplet can be respectively expressed as, $$F_{gt} = \rho Vg \sin\alpha \text{ and } F = \gamma D(\cos\theta_R - \cos\theta_A), \quad (3)$$

where ρ, γ, V, and D are the density, surface tension, volume, and wetting width of the liquid droplet, respectively; $\theta_A$ and $\theta_R$ are the advancing and receding contact angles, respectively; g is the acceleration due to gravity.

To quantify the force required to initiate the droplet motion, we gradually increase the tilting angle α until the water droplet begins to slide (i.e., $F_{gt}=F$). We compared the retention forces of Wenzel state droplets on the non-lubricated and lubricated surfaces. We systematically changed the surface roughness and measured the corresponding F. For lubricated surfaces with h=0 (or R=1), lubricant completely covered the nanoscopic posts forming a flat and molecularly smooth interface, yielding a SLIPS. Note that F for a Cassie droplet is defined as the retention force of a Cassie droplet on non-lubricated micropillars (w=L=50 µm, h=20 µm).

The measured F increases linearly with surface roughness R (FIG. 2f) on lubricated surfaces. This indicates that the retention force for a droplet in the Wenzel state on lubricated surfaces is linearly proportional to the liquid-lubricant contact area (or F∝R). Interestingly, the retention force of Wenzel droplets on the lubricated surface could be smaller than that of the Cassie droplet on a non-lubricated surface with the same solid fraction (FIG. 2f). This is because the retention force of a Cassie state droplet primarily results from pinning of the liquid contact line at the sharp edges of the solid textures. With the smoothened edges on a lubricated rough surface, the pinning is greatly minimized and thereby leads to significantly reduced surface retention force of liquid droplets regardless of their wetting states.

To further generalize our results, we examined the droplet mobility of a broad range of aqueous and organic liquids with surface tensions ranging from ~72.4 mN/m to ~19.9 mN/m on the lubricated rough surfaces (FIGS. 4a-4e). Results show that Wenzel droplet mobility on the slippery rough surfaces is maintained even for liquids with low contact angles. For example, hexadecane drops (γ=27.4 mN/m, θ=84.4°) are highly slippery on the lubricated rough surface (FIGS. 4a and 4b), but are strongly pinned on the silanized non-lubricated micropillars (FIGS. 4c and 4d). While lower surface tension liquids (i.e., heptane) exhibit higher retention forces than higher surface tension fluids (i.e., water), these liquids still maintain high drop mobility on the lubricated rough surfaces. To compare the relative magnitude of the retention force on lubricated and non-lubricated substrates, we define F* as the retention force of the Wenzel state droplet on lubricated micropillars normalized by that on non-lubricated ones with the same surface roughness. F* ranges from ~10% for high surface tension (72.4 mN/m) fluids to ~36% for low surface tension fluids (19.9 mN/m). In other words, the measured retention force values of Wenzel drops on these lubricated surfaces are significantly lower than those on non-lubricated surfaces (FIG. 4e). This is attributed to the reduction of pinning through smoothening of micro/nanoscopic edges by the lubricant. These results demonstrate that lubricated rough surfaces can substantially reduce retention force and thus enhance drop mobility of Wenzel drops with various surface tensions.

Our experimental results demonstrate that lubricated rough surfaces are capable of maintaining droplet mobility regardless of wetting state. It is important to note that Cassie-to-Wenzel transition can be easily induced on any textured surfaces, e.g., by high pressure, high temperature, low surface tension, surface contamination, for example. Such a transition will eventually render the liquids immobile on non-lubricated rough surfaces. While tremendous efforts have been invested in preventing or delaying the transition to the Wenzel state, our results show that one can circumvent this challenging issue altogether by simply coating a conformal layer of liquid lubricants on rough solid textures; doing so allows liquid droplets to maintain their mobility in both Cassie and Wenzel states. Thus, the slippery rough surfaces of the present disclosure can effectively circumvent the Wenzel-to-Cassie transition challenge, creating a simpler method of maintaining drop mobility.

The ability to repel liquids regardless of how they wet the rough surface has important technological implications for many industrial processes from condensation heat transfer to water harvesting to the prevention of icing and frosting. In certain applications, a slippery rough surface would be highly desirable due to its high surface area and slippery interface. To illustrate embodiments of the present disclosure, we have demonstrated application examples in fog harvesting and condensation using the slippery rough surfaces, and have shown that these surfaces outperform the state-of-the-art superhydrophobic surfaces (SHS) and SLIPS.

Figure 5:
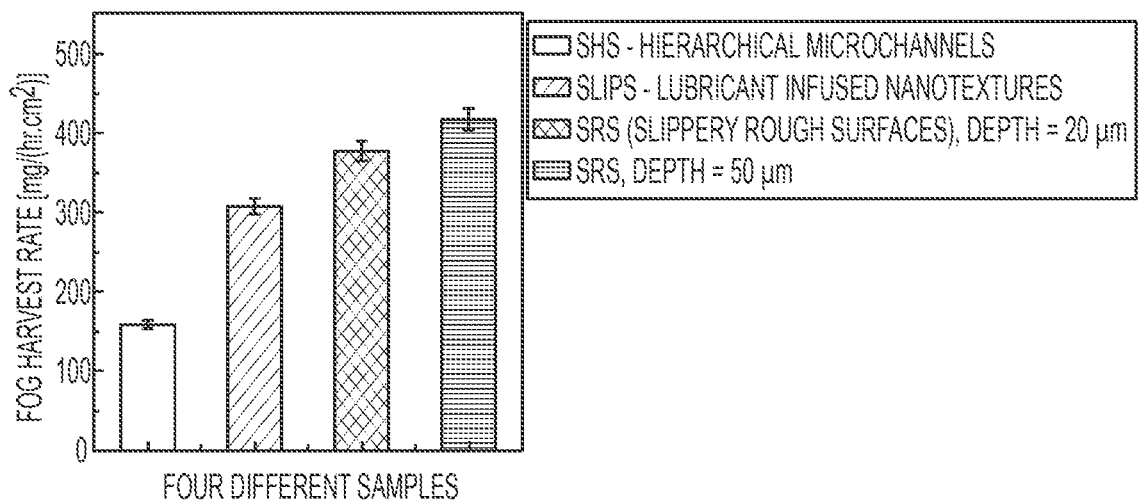
FIG. 5 is a plot showing fog harvesting performance of superhydrophobic surface (SHS), slippery liquid-infused porous surface (SLIPS) and slippery rough surface (SRS). SLIPS has a flat surface, while SHS and SRS have the depth of 19 μm. Error bars indicate standard deviations from three independent measurements.

In the first application example, we experimentally studied the fog harvesting rate on SHS (i.e., in the form of silanized hierarchical microchannels), SLIPS (i.e., lubricant infused nanotextures), and the slippery rough surfaces introduced in this effort (i.e., in the form of conformally lubricated microchannels) (FIG. 5). The surface structures were designed in the form of microchannels to enhance the effect of capillary wetting. The channel and pillar widths for microchannels were both 50 µm, with a depth ranging from 20 to 50 µm. In this experiment, hydroxy polydimethylsiloxane (PDMS) was used as the lubricant due to its relatively hydrophilic nature for enhanced capillary wetting. The slippery rough surface (of depth ~20 µm) exhibited a fog harvesting rate of 376.0 mg/(hr·cm$^2$) (mg—milligram, hr—hour, cm—centimeter), which is 22.2% faster than SLIPS and 136.8% faster than SHS (FIG. 5). Owing to the higher surface area relative to SLIPS, the slippery rough surface exhibited enhanced drop nucleation and coalescence, resulting in faster droplet removal. On SHS, microscopic liquid droplets were pinned onto the surface structures due to large Laplace pressure of the small droplets. As a result, SHS displayed a much smaller droplet removal rate compared to that of slippery rough surfaces. By increasing the depth of the microchannel from 20 µm to 50 µm, the fog harvesting rate on slippery rough surfaces increased by 11.1% (FIG. 5). This indicates that fog harvesting performance can be further optimized by engineering the dimensions of surface structures.

In another set of application-oriented tests, we studied phase-change processes such as dropwise condensation on the slippery rough surfaces using ESEM. The samples were maintained at −5° C. under a water vapor pressure of 3.8 torr (the associated saturation temperature is −2.5° C.) to facilitate the condensation process. While slippery rough surfaces have smaller surface areas compared to SHS, the drop mobility is higher due to the lubricated surface boundary. As a result, the slippery rough surfaces remove the condensates faster and further expose water-free areas for the next condensation cycle. Compared to SLIPS, slippery rough surfaces have larger surface areas, which greatly enhance the droplet nucleation and removal rates. These microscopic observations further validate and support the superior fog harvesting ability of slippery rough surfaces at the macroscale. These results indicate that slippery rough surfaces outperform state-of-the-art liquid repellent surfaces for fog harvesting and dropwise condensation functions owing to their high surface area and slippery interface.

In yet another set of application-oriented tests, we studied the oil adsorption ability of the slippery rough surface (in the form of lubricated aluminum meshes). Unlike conventional design of oil-water separating membranes, our mesh has the ability to repel almost all liquids, which overcomes the fouling problem of conventional oil adsorbents. To demonstrate the oil absorbing ability of the slippery rough surfaces, a lubricated mesh was put into an oil-water solution, which has already been separated into two distinct layers. We first dyed the mineral oil (Sigma Aldrich) to enhance visibility and mixed it with water. To separate mineral oil with water, we put the lubricated mesh screen into the mixture for a period of time. The mineral oil was absorbed on the mesh screen due to the superoleophilic nature of the lubricated mesh. Then we quickly take off the mesh screen from the mixture. The absorbed oil dripped off from the mesh completely due to the presence of the slippery interface, demonstrating to its anti-fouling property. Therefore, the lubricated mesh can be recycled without or with minimal cleaning requirement. Additionally, the mesh can collect oil in oil-water emulsion without any fouling.

In contrast to the well-established physical concept that a droplet in the Cassie state is mobile and a droplet in the Wenzel state is sticky, our study shows the conceptually different perspective that both Cassie and Wenzel droplets can be mobile. Not only is the identification of the slippery Wenzel state of fundamental importance, these new findings can be used to design a new type of liquid repellent strategy for many industrial applications where enhancing droplet mobility and removal is important. While our work used silicon as an example, the design principle can be easily extended to other material systems such as metals, glasses, ceramics, and plastics owing to the diverse fabrication technologies available to create hierarchical surface architectures. Moreover, one can engineer the composition of the coatings (e.g., viscosity or phase change temperatures of lubricants) for their uses in different environmental conditions, such as extreme temperature or humidity. The longevity of the lubricated rough surfaces can be engineered by choosing lubricants with low evaporation rate, low miscibility, and reduced wrapping of the lubricant around the contacting fluid. When necessary, the longevity of the lubricants could be further enhanced by infusing these lubricants into polymeric coatings as reservoirs. Since our slippery rough surfaces combine the unique advantages of superhydrophobic surfaces (i.e., high surface area) and SLIPS (i.e., slippery interface) and can repel liquids in any wetting state, these surfaces will find important industrial applications related to liquid harvesting, liquid absorption/separation, and phase change applications. For example, the slippery rough surfaces could further enhance condensation heat transfer as compared to superhydrophobic surfaces, even in relatively high temperature environments such as those that exist in heat exchangers or organic Rankine cycles. In icing condition, the lubricated rough surfaces could readily shed off liquid condensates in the Wenzel state to delay frost and ice formation. These lubricated rough surfaces could provide water harvesting in high humidity conditions faster than the state-of-the art liquid-repellent surfaces. Many of these water condensates have traditionally pinned to the surface texture—a result of irreversible transition from the Cassie state to the "sticky" Wenzel state. In addition, the lubricated rough surfaces can also serve as drag reduction and anti-biofouling coatings. The ability to repel fluids in any wetting state may open up new opportunities for scientific studies and engineering applications related to adhesion, nucleation, transport phenomena, and beyond.

Examples

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

When a liquid droplet rests on top of a roughened surface and the droplet has not impregnated the surface textures but rather gas fills the textures, the droplet is in the Cassie state. Our substrates are hierarchically structured such that lubricant fills the nanostructures, while gas fills the microstructures, thus creating a conformal lubricant layer on the microstructures. We consider a liquid droplet that does not impregnate the microtextures to be in the Cassie state. We have demonstrated that our slippery rough surfaces still maintain high droplet mobility in the Cassie state on these slippery rough surfaces.

Fabrication and Characterization of Nanotextured Micropillars.

Figure 6A:
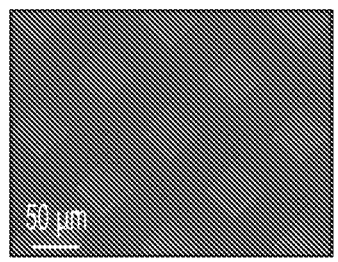
FIGS. 6a-6d show the characterization of nanotextured micropillars.
Figure 6B:
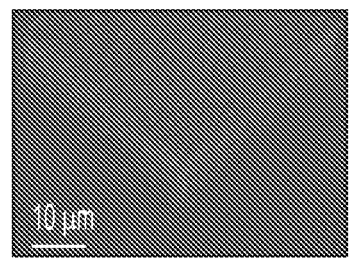
Figure 6C:
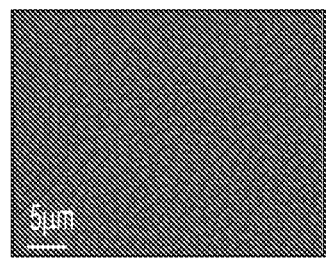
Figure 6D:
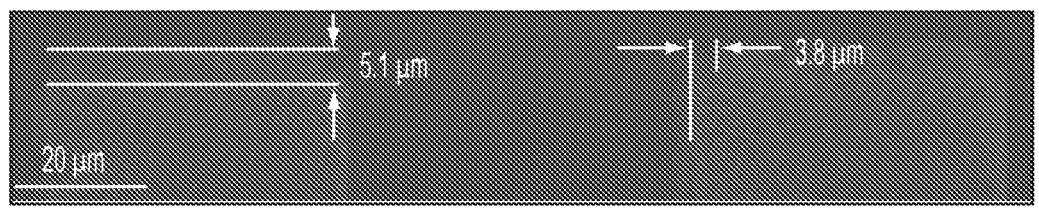
Figure 10A:
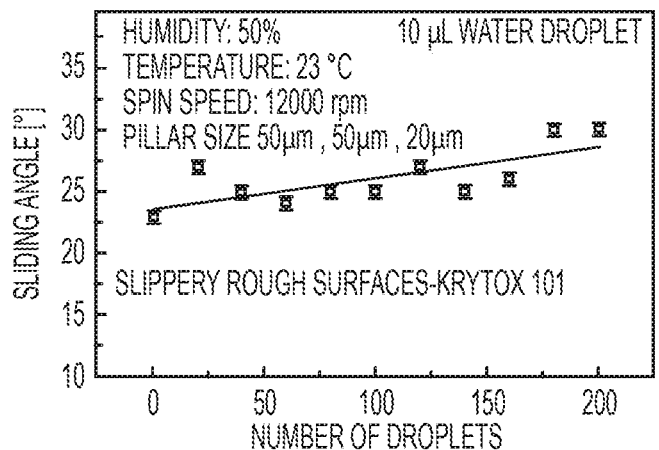
FIGS. 10a-10b are charts showing the wrapping layer effect on the liquid repellency of slippery rough surfaces

Square-shaped silicon micropillars were fabricated using standard photolithography and deep reactive-ion etching (DRIE) on a 4 inch <100> p-type silicon wafer with a thickness of 400 µm. Then the photoresist on the top surfaces and polymer on the side walls of micropillars were removed by oxygen plasma. A wet etching method was used to create nanotextures on the surfaces of square micropillars. The microstructured silicon wafer obtained from the previous step was cleaned in Piranha solution to remove the organics and then in the 5% hydrofluoric acid (HF) solution for 20 seconds to remove the oxide layer. Subsequently, the wafer was immediately immersed into a solution of 4.8 M HF and 0.01 M silver nitride ($AgNO_3$) for 1 min to deposit catalysts. The $Ag^+$ was reduced to Ag nanoparticles, which could be deposited on the top, bottom and side walls of the microstructured silicon surfaces. These Ag nanoparticles acted as catalysts to enhance local etching speed during the etching process. The microstructured wafer with the catalyst was put in the etching solution containing 4.8 M HF and 0.3 M hydrogen peroxide ($H_2O_2$) for 6 to 7 min. After the catalyst deposition and etching step, the wafer was placed into the dilute nitric acid solution to dissolve the silver dendrites. In the end, the wafer was washed with DI water and dried with nitrogen gas. Patterned nanotextured micropillars were obtained on the silicon wafer (FIG. 6a, b and c). The height of the nanotextures is 5.1 µm on the top of the micropillars and 3.8 µm on the side wall, respectively (FIG. 6d). The roughness of the nanotextures was estimated to be 14.6±0.3 on the side of the micropillar and 19.3±0.4 on the top of the micropillar through image analysis of high resolution scanning electron micrographs. Image analyses were conducted using MATLAB. The greyscale image (i.e., an image with pixel intensities ranging over a spectrum from 0 to 1, where 0 is black and 1 is white) shown in FIG. 10c was converted to a binary image (i.e., where pixel intensities are either 0 or 1) based on a set intensity threshold. To ensure that we chose an intensity threshold such that nanotexture tops were captured as white area and the rest of the image was captured as black area, we calculated the roughness at 40 different threshold values from 0 to 1. A plateau in the roughness versus threshold value occurred approximately between a threshold of 0.2 and 0.4, so the average of roughness values between these points was used as the roughness. To ensure that 40 threshold points yielded an appropriate resolution, this average roughness was calculated for varying resolutions until convergence was apparent, and a resolution of 40 points proved to be sufficient.

Fabrication of Nanotextured Aluminum Mesh

Nano-textured aluminum meshes were fabricated by two-step etching processes. The aluminum mesh was washed by diluted hydrochloric acid for 10 min to remove the oxidized layer on the surface. Then steam was used to oxidize the mesh for 1 hour in atmospheric pressure (101 kPa) to form boehmite nanotextures. The mesh wire is uniformly etched with nanotextures, which is helpful to enhance the hydrophobicity and the lubricant retention on the surface. The diameter of the mesh wire varies from 53 µm to 400 µm. The nano boehmite structure on the wire has a depth of tens of nano meters.

Silanization and Lubrication.

Figure 7A:
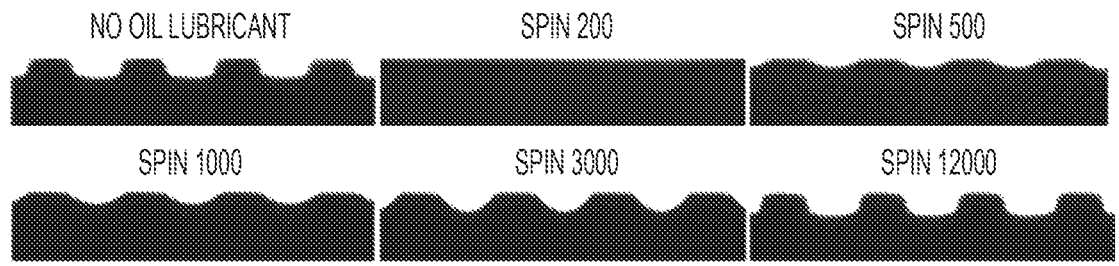
FIGS. 7a-7d shows the lubrication results of a textured surface having a plurality of raised elements in the form of micropillars.

The nanotextured silicon microstructures/aluminum mesh were silanized using either heptadecafluoro-1,1,2,2-tetrahydrodecyltrichlorosilane (Gelest Inc.) or trimethylchlorosilane (Sigma-Aldrich). These silanes were deposited onto the silicon surfaces in a vacuum chamber for 4 hours, and were deposited onto aluminum mesh in ethanol solution for 20 hours, or less time with higher temperature Afterwards, lubricant such as Krytox 101 (DuPont, viscosity of 17.4 cSt at 20° C.) was coated on the silanized nanotextured micropillars using a spin coater. The lubricant thickness was controlled by the spin speed of the spin coater. Higher spin speed can remove more lubricants and yield a lubricant layer that is more conformal to the micropillars. The cross sections of micropillars were visualized by a goniometer. Increased spin speed helps to remove the lubricants between two micropillars as shown in the ESEM images of FIG. 7a.

Experimental Verification of Stable Lubricated Film Formation

We conducted further analysis to show that conformal lubricant coating can be achieved on the microstructures for all solid-lubricant combinations against various contacting fluids investigated in this work. In order to form a thermodynamically stable lubricant layer within the nanotextures, the solid-lubricant combination should satisfy the following relationships[3,24]:

$$\Delta E_1 = r(\gamma_B \cos\theta_B - \gamma_A \cos\theta_A) - \gamma_{AB} > 0 \quad \text{(Eq. S1)}$$

$$\Delta E_2 = r(\gamma_B \cos\theta_B - \gamma_A \cos\theta_A) + \gamma_A - \gamma_B > 0 \quad \text{(Eq. S2)}$$

where r is the roughness of the nanotextures; $\gamma_A$ and $\gamma_B$ are, respectively, the surface tensions for the foreign liquid (Liquid A) and for the lubricant (Liquid B); $\gamma_{AB}$ is the interfacial tension between the foreign liquid and lubricant; $\theta_A$ and $\theta_B$ are, respectively, the equilibrium contact angles for the foreign liquid and the lubricant on a flat solid surface. These relationships dictate the solid lubricant combinations that form an energetically stable lubricating film within the textured solid without being displaced by an external fluid. Our experimental measurements (Table 1) confirmed that the solid/lubricant/foreign liquid combinations used in our experiments fulfilled the requirements outlined by Eqs. S1 and S2 (i.e., $\Delta E_1 > 0$ and $\Delta E_2 > 0$).

TABLE 1

Theoretical and experimental verifications for the formation of the stable conformally lubricated microstructures.

| Solid | Liquid A | Liquid B | r | $\gamma_A$ | $\gamma_B$ | $\gamma_{AB}$ | $\theta_A$ | $\theta_B$ | $\Delta E_1$ | $\Delta E_2$ | Stable? Theory | Stable? Exp. |
|---|---|---|---|---|---|---|---|---|---|---|---|---|
| Silanized silicon-1 | Water | Krytox 101 | 14.6 | 72.4 | 17.0 | 56.4 | 121.3 | 42.3 | 675.7 | 787.5 | Y | Y |
| Silanized silicon-1 | Glycerol | Krytox 101 | 14.6 | 60.1 | 17.0 | 40.5 | 122.6 | 42.3 | 615.6 | 699.2 | Y | Y |
| Silanized silicon-1 | Ethylene glycol | Krytox 101 | 14.6 | 48.2 | 17.0 | 28.1 | 112.4 | 42.3 | 423.5 | 482.8 | Y | Y |
| Silanized silicon-1 | Hexadecane | Krytox 101 | 14.6 | 27.3 | 17.0 | 8.7 | 84.9 | 42.3 | 139.0 | 158.1 | Y | Y |
| Silanized silicon-1 | Undecane | Krytox 101 | 14.6 | 24.6 | 17.0 | 6.7 | 76.3 | 42.3 | 91.6 | 105.9 | Y | Y |
| Silanized silicon-1 | Ethanol | Krytox 101 | 14.6 | 21.1 | 17.0 | 23.5 | 76.4 | 42.3 | 87.4 | 115.0 | Y | Y |
| Silanized silicon-1 | Hydrid PDMS | Krytox 101 | 14.6 | 20.2 | 17.0 | 5.6 | 66.1 | 42.3 | 58.5 | 67.2 | Y | Y |
| Silanized silicon-1 | Heptane | Krytox 101 | 14.6 | 19.9 | 17.0 | 2.7 | 62.8 | 42.3 | 48.0 | 53.6 | Y | Y |
| Silanized silicon-2 | Water | Mineral oil | 14.6 | 72.4 | 28.6 | 50.1 | 90.5 | 32.4 | 311.1 | 405.0 | Y | Y |
| Silanized silicon-2 | Water | Hydroxy PDMS | 14.6 | 72.4 | 21.1 | 7.0 | 90.5 | 13.1 | 301.8 | 360.0 | Y | Y |

Note:
"Silanized silicon-1" refers to nanotextured microstructures were silanized by the heptadecafluoro-1,1,2,2-tetrahydrodecyltrichlorosilane and "Silanized silicon-2" refers to those silanized by trimethylchlorosilane. "Y" indicates that Liquid B can form stable conformally lubricated microstructures. $\gamma_A$ and $\gamma_B$ represent the surface tensions of Liquid A and Liquid B, respectively (Table 2). $\gamma_{AB}$ represents the interfacial tension between Liquid A and Liquid B (Table S3). $\theta_A$ and $\theta_B$ are the static contact angles on silanized flat silicon substrate (Table 4).

TABLE 2

Measured Surface Tension for Various Polar and Non-Polar Liquids.

| Liquids | Surface tension (mN/m) | Number of measurements |
|---|---|---|
| Water | 72.4 ± 0.2 | 5 |
| Glycerol | 60.1 ± 0.5 | 5 |
| Ethylene glycol | 48.2 ± 0.3 | 5 |
| Hexadecane | 27.3 ± 0.2 | 5 |
| Undecane | 24.6 ± 0.3 | 5 |
| Ethanol | 21.1 ± 0.3 | 5 |
| Hydrid PDMS | 20.2 ± 0.3 | 5 |
| Heptane | 19.9 ± 0.4 | 5 |
| Krytox 101 | 17.0 ± 0.2 | 5 |
| Mineral oil | 28.6 ± 0.2 | 5 |
| Hydroxy PDMS | 21.1 ± 0.3 | 5 |

TABLE 3

Measured Interfacial Tension between Two Immiscible Liquids.

| Liquid/Liquid | Interfacial tension (mN/m) | Number of measurements |
|---|---|---|
| Water/Krytox 101 | 56.4 ± 1.0 | 5 |
| Glycerol/Krytox 101 | 40.5 ± 0.4 | 5 |
| Ethylene glycol/Krytox 101 | 28.1 ± 0.2 | 5 |
| Hexadecane/Krytox 101 | 8.7 ± 0.2 | 5 |
| Undecane/Krytox 101 | 6.7 ± 0.1 | 5 |
| Ethanol/Krytox 101 | 23.5 ± 0.6 | 5 |
| Hydrid PDMS/Krytox 101 | 5.6 ± 0.2 | 5 |
| Heptane/Krytox 101 | 2.7 ± 0.1 | 5 |
| Mineral oil/Water | 50.1 ± 0.5 | 5 |
| Hydroxy PDMS/Water | 7.0 ± 0.3 | 5 |

TABLE 4

Measured Static Contact Angles of Various Liquids on Silanized Flat Silicon.

| Solids | Liquids | Contact angle (degrees) | Number of measurements |
|---|---|---|---|
| Silanized flat silicon-1 | Water | 121.3 ± 0.9 | 5 |
| Silanized flat silicon-1 | Glycerol | 122.6 ± 0.4 | 5 |
| Silanized flat silicon-1 | Ethylene glycol | 112.4 ± 0.6 | 5 |
| Silanized flat silicon-1 | Hexadecane | 84.9 ± 0.4 | 5 |
| Silanized flat silicon-1 | Undecane | 76.3 ± 0.5 | 5 |
| Silanized flat silicon-1 | Ethanol | 76.4 ± 0.7 | 5 |
| Silanized flat silicon-1 | Hydrid PDMS | 66.1 ± 0.6 | 5 |
| Silanized flat silicon-1 | Heptane | 62.8 ± 0.3 | 5 |
| Silanized flat silicon-1 | Krytox 101 | 42.3 ± 0.5 | 5 |
| Silanized flat silicon-2 | Water | 90.5 ± 1.2 | 5 |
| Silanized flat silicon-2 | Mineral oil | 32.4 ± 1.1 | 5 |
| Silanized flat silicon-2 | Hydroxy PDMS | 13.1 ± 0.4 | 5 |

Choice of Lubricants and Silanes

Figure 11A:
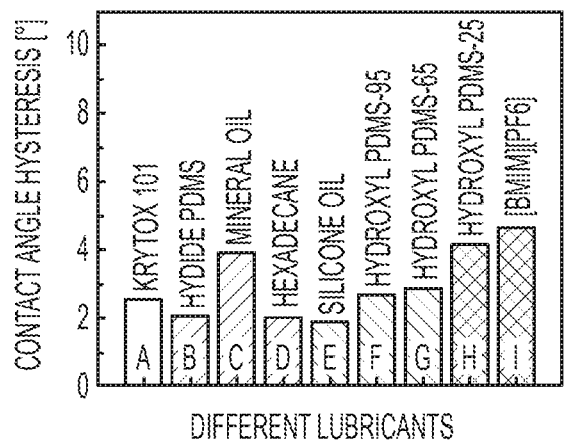
FIGS. 11a-11b show contact angles for various lubricants.
Figure 11B:
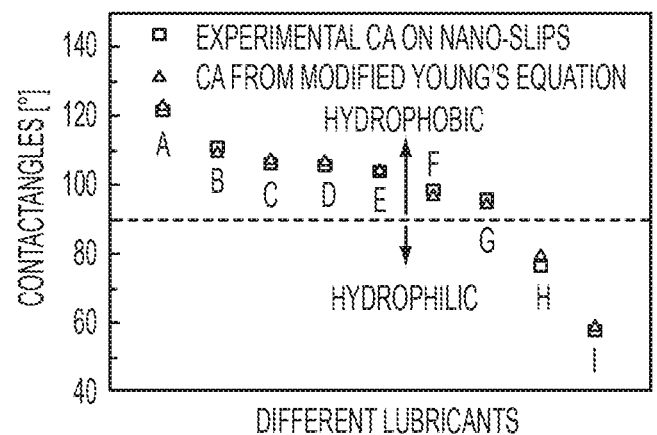
Figure 12:
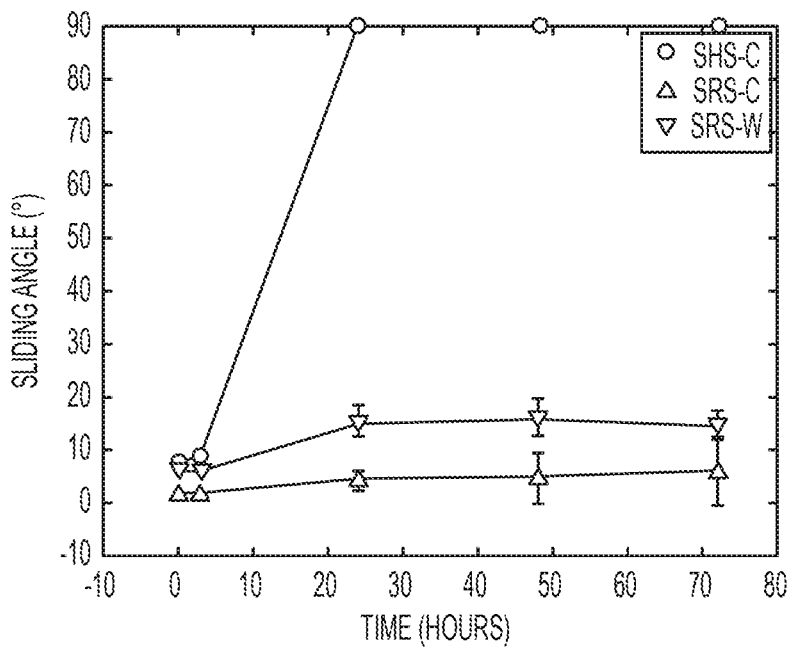
FIG. 12 is a plot showing the comparison of liquid repellency performances between slippery rough surfaces (in both Cassie and Wenzel state) and superhydrophobic surfaces after the surfaces have been submerged into the bacterial solutions at specific period of time. Note that the dotted line indicated that the water droplets wet and pin onto the superhydrophobic surface.

In addition to the use of perfluorinated oils and fluorinated silanes, one can tune the surface hydrophobicity of the slippery rough surfaces based on a broad range of hydrophobic and hydrophilic lubricants as long as both the Eq. S1 and S2 are satisfied. In choosing different lubricants, the silanes coating would need to be adjusted accordingly. As a demonstration, we have shown that trimethylchlorosilane can be used for various hydrophilic and hydrophobic lubricants ranging from hydroxyl polydimethylsiloxane, silicone oils, hydrocarbons (e.g., hexadecane), mineral oils, hydride polydimethylsiloxane, and perfluorinated oils. These silane and lubricants combinations can be used to repel water. For example, FIG. 11 shows the contact angle for various lubricant/silane coatings on a surface that does not have a dual length scale hierarchical roughness to illustrate the various combinations.

Environmental Scanning Electron Microscope (ESEM).

After the lubrication process, the nanotextures were fully submerged under the lubricant layer. The lubricated micropillars were visualized by an ESEM to capture the distribution of oil lubricants on an angled stage (40°~60°). The applied voltage was 20 kV and current was 2.1 nA for the operation of ESEM. To minimize the evaporation of oil lubricants, the temperature was reduced to −5° C. before the low vacuum was applied. The pressure was set at 3.8 torr, which is much higher than the saturation pressure of Krytox 101 at −5° C. From the ESEM images (FIGS. 7b, c and d), it is evident that at a spin speed of 3000 rpm, the lubricated bottom surface is exposed but the bottom corners are thickly covered by lubricant owing to the capillary force. However, at a spin speed of 12000 rpm, the lubricants were only retained within the nanotextures, and were completely removed from the space between micropillars. The lubricated surfaces (FIG. 7d) therefore showed a surface morphology similar to that of non-lubricated micropillars. The whole surface shows patterned micropillars with a conformal lubricant layer.

Figures 7B, 7C, 7D:
Figures 8A, 8B, 8C:
FIGS. 8a-8f show the contact angles of water droplets on Krytox 101 lubricated microstructures.
Figures 8D, 8E, 8F:
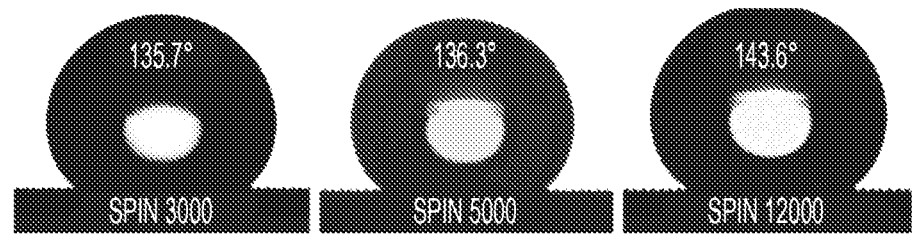

In this experiment, the surface roughness was calculated based on w, L, and h (See definitions in the main text). Since the lubricant covered the bottom corners of the micropillars, the lubricated micropillars do not have a well-defined geometry (FIG. 7b). We measured h from the top of the lubricated micropillar to the bottom of the lubricated surfaces. When the spin speed is 12000 rpm (FIG. 7d), the calculated roughness closely resembles the actual roughness as verified by the high-resolution electron micrographs.

Contact Angle and Sliding Angle on Lubricated Microstructures.

The sliding angle was measured by an automated goniometer (ramé-hart) at room temperature (21-24° C.) with ~20% relative humidity. The system was calibrated each time before the measurements were conducted. The image of the droplet was captured through a camera equipped with the optical system and the drop imaging software measured the contact angle, contact angle hysteresis, and the sliding angle.

In an effort to measure the contact angle under known and repeatable conditions, a lubrication protocol was established. As part of the protocol, we coated oil lubricant onto the nanotextured micropillars (w=47 µm, L=53 µm, h=19 µm) at a spin speed of 12000 rpm. The lubricant was trapped in the nanotextures, creating a surface with lubricated micropillars (FIG. 7d). The contact angle was measured on the liquid infused nanotextures (FIG. 8a) and lubricated rough surfaces with different lubricant thicknesses (FIGS. 8b-f).

Figure 9:
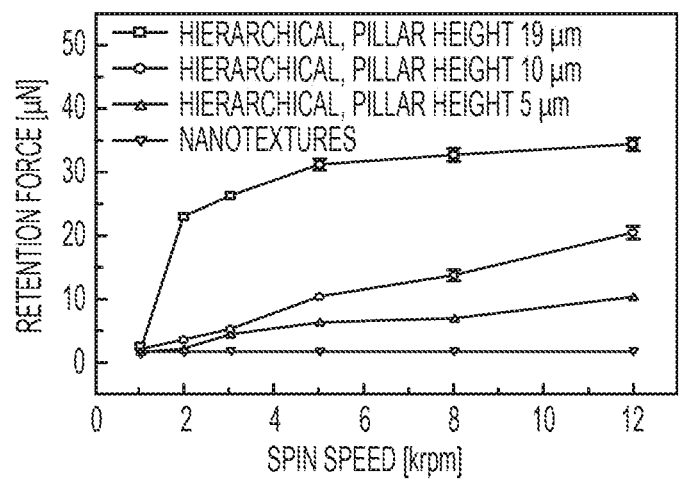
FIG. 9 is a chart showing the retention forces of water droplets on the lubricated rough surfaces with different pillar heights. Error bars represent the standard deviation for three independent measurements.

During the measurement, the stage was tilted automatically at the speed of 1 degree/second and the drop image was captured every second. The sliding angle can be obtained by analyzing those images. When the contact line starts to move, the associated tilted angle is taken as the sliding angle. The accuracy of the measurement is ±0.5°. The measured sliding angles were used to estimate the droplet retention forces on the lubricated rough surfaces with different pillar heights (FIG. 9).

Fabrication of Nanotextured Microgrooves

Microgrooves on aluminum surface were fabricated using a standard micromachining. The groove size and space between grooves are ~200 µm. The aluminum residues and other surface contaminations (e.g., oils) generated from the machining were removed by ultrasonic cleaning in acetone for 15 min. An acid wash process was used to remove an oxidized aluminum layer on the surface, which may inhibit the growth of boehmite nanotexture. The microgrooved aluminum was washed in diluted hydrochloric acid (1 wt. %) for 10 min, and then cleaned by DI water. A water steam etching was used to create boehmite nanotextures on the surfaces of grooves. The microgrooved aluminum cylinder was put in a water steam environment at 100 C.° with a pressure of 105 kPa for 20 min. The nanotextured microgrooves were created on aluminum cylinder.

Silanization and Lubrication

Oxygen plasma was conducted before silanization. The nanotextured microgrooved aluminum cylinder was cleaned and surface activated in an oxygen plasma cleaner (Harrick) for 15 min. The nanotextured aluminum microstructures were silanized using 1H,1H,2H,2H-perfluorodecyltriethoxysilane (Sigma-Aldrich). The silane molecules were deposited onto aluminum in ethanol solution at 80 C.° for 4 hours. Afterwards, lubricant such as Krytox 101 (DuPont, viscosity of 17.4 cSt at 20° C.) was coated on the silanized nanotextured microgrooves by spray coating, and excess lubricant between the grooves was removed by a nitrogen gun.

Fog Harvesting, Dropwise Condensation

The slippery rough surfaces have a wide range of applications, such as water harvesting, dropwise condensation, advanced heat exchange, and refrigeration. Three surfaces, including SHS (i.e., silanized hierarchical microchannels), SLIPS (i.e., lubricant infused nanotextures) and slippery rough surfaces (i.e., microchannels with conformal lubrication) were used to compare their performance in the applications of fog harvesting and dropwise condensation. The micro/nano hierarchical microchannels were fabricated using aforementioned DRIE and wet etching methods.

A conventional ultrasonic humidifier (Crane EE-5301) was used to produce cool mist. The lubricated rough substrates were placed vertically, facing the mist. The distance between the outlet of the humidifier and the vertical substrate was ~15 cm. The dripping water was collected by a clean beaker. The weight of the beaker before and after collection was measured as $M_b$ and $M_a$, respectively. The weight of the lubricated sample before and after collection was measured as $M_{sb}$ and $M_{sa}$, respectively. The total mass of harvested fog in a given interval of time was $M_f=(M_{sa}+M_a)-(M_{sb}+M_b)$. These measurements accounted for the residual water on the lubricated substrate and exclude the lubricant that was carried away by the collected water droplets.

The dropwise condensation experiment was performed on a peltier cooling stage inside an ESEM. The slippery rough surfaces were functionalized by trimethylchlorosilane silane and lubricated by hydroxy PDMS (Sigma Aldrich, viscosity 25 cSt). The lubricant thickness was controlled by the speed of a spin coater. We used a speed of 12000 rpm as it allowed for conformal lubrication. The chamber pressure, temperature, and humidity in the ESEM were set to 3.8 Torr, −5° C. and 85%, respectively. The tilted angle of the sample was 50°. To minimize the evaporation of lubricant, we decreased the chamber temperature to 0° C. before we loaded the sample.

Longevity and Robustness of the Slippery Rough Surfaces

The longevity of the lubricated rough surfaces is highly reliant on three factors, including: I) the miscibility of lubricant and the contacting fluid, II) the evaporation rate of the lubricant, as well as III) the wrapping of the lubricant around the contacting fluid. In order to enhance longevity for a given application, the lubricant should be chosen for its low miscibility, low evaporation rate and reduced wrapping around the contacting fluid. There are many commercial lubricants with negligible solubility with water. For instance, the solubilities of water in perfluorinated oils, mineral oils, and liquid polydimethylsiloxane are 1.76 mol/m$^3$, 2.14 mol/m$^3$ and 36 mol/m$^3$, respectively[36]. In the following discussion we will focus on the longevity characterizations of water-immiscible lubricants infused into the slippery rough surfaces.

Evaporation of Lubricants

We studied the evaporation rates of the lubricants infused into the slippery rough surfaces using a high resolution analytical balance (Mettler Toledo XP504 DeltaRange, resolution=0.1 mg). A previous study on SLIPS has shown that the lifetime of the lubricant varies significantly with its viscosity and chemical composition. Based on this study, we have evaluated a number of different lubricants for the longevity tests. The lubricants under investigations include perfluorinated oils (e.g., Krytox 101 and Krytox103, DuPont) and mineral oil. Different Krytox oils have different viscosities, ranging from Krytox 100 to 107 with increasing viscosity and boiling point. We have conducted experiments to monitor the evaporation of the lubricants on the lubricated rough surfaces under static, ambient conditions. We define the relative mass of lubricant, M*, as the residual lubricant weight in the textures at an instant in time M(t) normalized by the original lubricant weight $M_0$, i.e., $M^*(t)=M(t)/M_0$, where t is time. Consistent with the earlier study, we found that the relative mass of Krytox 101 reduced by about 35% over the course of 14 days, while that of Krytox 103 or mineral oil only reduced by about 5-10% during the same period of testing. These results support that choice of lubricant properties influence lubricant longevity.

To further study the effect of lubricant evaporation on the liquid repellency of the lubricated rough surfaces, we continued to study the drop mobility on the Krytox 101, Krytox 103, and mineral oil lubricated rough surfaces. Consistent with our lubricant evaporation data, the rough surfaces lubricated with Krytox 101 showed noticeable degradation of liquid repellency over the course of 14-days as exhibited by the significant increase in the sliding angle (i.e., an increase of 9 degrees). In comparison, both of the rough surfaces lubricated by Krytox 103 and mineral oil showed consistent liquid-repellency performance within our 14-day experimental time frame (i.e., an increase of <3 degrees). Our experimental data further supported that the longevity of slippery rough surfaces can be engineered by selecting appropriate lubricants for specific applications.

Wrapping Layer: Lubricants Spreading onto Contacting Fluid

A third factor impacting the longevity of the slippery rough surfaces is the lubricant wrapping layer around the contacting fluid droplet. When considering lubricant-droplet interactions, it is important to determine whether the lubricant forms a wrapping layer around the droplet. Such information is important because the formation of a wrapping layer implies the loss of lubricant volume as the droplet slides off of the lubricated surface. This lubricant loss leads to an undesirable decrease in the liquid repellency of the surface. To determine whether a wrapping layer forms, we assume that the surface energy of the substrate-lubricant-droplet system is minimized. Consider a system where a liquid droplet sits on a lubricant-infused surface. We assume that the droplet and the lubricant are immiscible and that the droplet does not displace the lubricant. Let the surface energy associated with the droplet with no wrapping layer be $E_1$. The energy state is therefore given by:

$$E_1 = \gamma_{l_1 v} A_1 + \gamma_{l_1 l_2} A_2 \quad \text{(Eq. S3)}$$

where $\gamma_{l_1 v}$ is the surface tension of the contacting fluid droplet in vapor and $\gamma_{l_1 l_2}$ is the interfacial tension between the contacting fluid droplet and lubricant. $A_1$ is the area of the droplet-vapor interface and $A_2$ is the area of the droplet-lubricant interface. Now we consider a similar case where the droplet has a full or partial lubricant wrapping layer surrounding the droplets. Assuming that the wrapping layer is thin such that the area $A_1$ of the droplet is approximately constant, the energy state of this droplet is:

$$E_2 = \gamma_{l_1 v}(1-\beta)A_1 + \gamma_{l_2 v}\beta A_1 + \gamma_{l_1 l_2}(\beta A_1 + A_2) \quad \text{(Eq. S4)}$$

where $\beta$ is the fraction of $A_1$ coated with a lubricant wrapping layer and $\gamma_{l_2 v}$ is the surface tension of the lubricant in vapor. In order to prevent a wrapping layer, the former system must be energetically more favorable than the latter. Specifically, the criterion for the non-existence of a full wrapping layer is:

$$E_1 < E_2$$

$$\gamma_{l_2 v} - \gamma_{l_1 v} - \gamma_{l_1 l_2} < 0 \quad \text{(Eq. S5)}$$

TABLE S5

| | | | | | | |
|---|---|---|---|---|---|---|
| In our experiments, we consider the vapor phase to be air. | | | | | | |
| Lubricant | Droplet | Droplet Surface Tension (mN/m) | Lubricant Surface Tension (mN/m) | Lubricant/Droplet Interfacial Tension (mN/m) | Eq. S3 | Wrapping Layer? |
| K101 | Water | 72.4 ± 0.1 | 17.0 ± 0.3 | 55.3 ± 0.5 | 0.1 ± 0.9 < 0 | Yes/No |
| K103 | Water | 72.4 ± 0.1 | 17.8 ± 0.3 | 56.3 ± 0.5 | −1.7 ± 0.9 < 0 | No |
| Mineral Oil | Water | 72.4 ± 0.1 | 28.6 ± 0.3 | 50.1 ± 0.5 | −6.3 ± 0.9 < 0 | No |

Based on Eq. S5, we predicted the possible formation of full wrapping layers of various lubricants around water (the contacting fluid). We measured the surface tension of water and the lubricants, as well as the lubricant-water interfacial tensions in order to obtain the predictions. It is predicted that Krytox 101 may form a wrapping layer around a water droplet whereas Krytox 103 and mineral oil should not (Table S5).

Figure 10B:
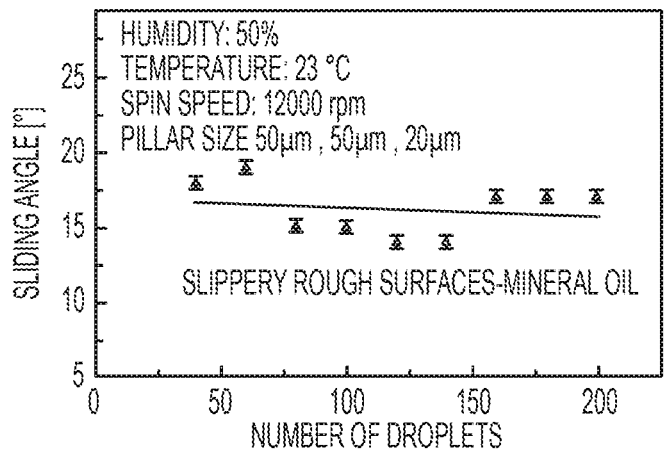

Based on the predictions, we conducted multiple sliding droplet experiments to evaluate the wrapping layer effect on the longevity of the slippery rough surfaces. In line with the prediction, dropping water droplets continuously on the rough surfaces lubricated with Krytox 101 degrades the surface over time as indicated by the increasing sliding angle (FIG. 10a); the rough surfaces lubricated with mineral oil did not degrade over time (FIG. 10b). When necessary, the longevity of the lubricants can be further enhanced by infusing these lubricants into polymeric coatings serving as reservoirs.

Anti-Biofouling Properties of Slippery Rough Surfaces

Anti-biofouling surfaces are of interest in various fields from medicine to seafaring ship design. In medicine, anti-fouling surfaces would prolong the lifetime of medical devices such as catheters and reduce the spread of disease via surface contamination. In naval applications, such surfaces would prevent barnacle buildup on ships and thus reduce drag and wasted energy. While conventional superhydrophobic surfaces can successfully prevent bio-fouling for short periods of time (i.e., a few hours), organisms such as bacteria can still adhere to the solid surface eventually eliminating its anti-fouling capabilities. Other methods for anti-fouling coatings are to incorporate chemicals such as copper and/or co-biocides to prevent fouling. These options are less than ideal, however, as they either contribute to the rise of "super-bugs" or may pose environmental hazards.

Slippery rough surfaces address anti-fouling through a different mechanism a mechanism similar to that of slippery liquid-infused porous surfaces (SLIPS). The conformal liquid layer inhibits bio-fouling because there is no solid surface onto which organisms (such as bacteria) can attach. If they do settle onto the lubricant layer of the SRS, they can be easily removed via shear force as the lubricant layer is mobile.

To assess the anti-biofouling properties of SRS and compare their anti-fouling performance to conventional surfaces, we immersed the following surfaces in static (i.e., non-flowing) media containing the same starting concentration of *Escherichia coli*: porous polytetrafluoroethylene (PTFE) membrane with 200 μm pore sizes, the same PTFE membrane material infused with Krytox 101 (or SLIPS), a superhydrophobic surface on which a water droplet would be in the Cassie state, and a SRS with the same geometry as the SHS surface and on which a water droplet would be in the Cassie state, and a SRS surface in which a water droplet would be in the Wenzel state. We measured the sliding angle of a 100 μL droplet on each at different instants in time, and also checked the absorbance of the bacteria medium to 600 nm wavelength light as a means of quantifying the bacteria density. Superhydrophobic surfaces on which a water droplet would be in the Wenzel state were excluded from this experiment as the sliding angle of a droplet on this surface is very high before even being exposed to the bacteria medium. Moreover, we took samples of the media and dyed the bacteria every 24 hours to determine if the bacteria were thriving (and thus able to adhere to the surfaces).

Our results show that the liquid repellency of the PTFE membrane breaks down after only 3 hours, and SHS shows signs of contamination after 3 hours. After 24 hours of incubation, the liquid repellency of SHS is completely damaged. In contrast, SRS shows persistent anti-biofouling performance even after >70 hours immersion inside the bacteria media. The biofilm that is formed onto the surface can be removed spontaneously by the motion of a water droplet tilted at <20° with respect to a horizontal surface, indicating very low adhesion of the biofilm with the surface.

Drag Reduction on Slippery Rough Surfaces

Slippery rough surface can reduce friction and save energy for marine ships. We design the slippery rough surface in a way such that air can be trapped within the lubricated micropillars to maintain water flow in the Cassie state. In this particular example, we designed the slippery rough surfaces with square micro pillars (width=15 μm, height=50 μm, pitch size=40 μm), which were covered with water-immiscible liquid lubricants.

In order to demonstrate the feasibility of slippery rough surfaces to reduce drag, we have measured the slip lengths of the surface by a rheometer using the published protocols. See C.-H. Choi and C.-J. Kim, "Large Slip of Aqueous Liquid Flow over a Nanoengineered Superhydrophobic Surface," Phys. Rev. Lett., vol. 96, no. 6, p. 066001, February 2006. Slip length is a measure of drag reduction capability of the surface to a specific test liquid and is independent of dimensions of the flow field. In particular, the slip length of a fluid across a surface can be estimated from the torque measurement by a rheometer. The torque, M, is related to the slip length, b, by the following equation derived from the Navier-Stoke equation using Navier's assumption that slip velocity is proportional to the shear rate at the wall, $$M = \frac{2\pi\mu\Omega R^3}{3\theta_0}\left(1 - \frac{3b}{2R\theta_0} + \frac{3b^2}{R^2\theta_0^2} - \frac{3b^3}{R^3\theta_0^3}\ln\left(\frac{R\theta_0 + b}{b}\right)\right)$$

where μ is fluid viscosity, R is the cone radius, Ω is the angular velocity of the cone, and $\theta_0$ is the cone angle.

To measure the torque M, a commercial rheometer (DHR-2, TA Instruments) was used which has a stainless steel cone with 40 mm diameter and 1° cone angle. The torque was measured under a constant shear rate 100 $s^{-1}$. The test fluid is water.

The liquids viscosity μ in (eq.1) were measured through control experiments performed directly on the stainless steel plate. This is under the assumption that on smooth stainless steel the slip length is negligible. The torque results of these tests were set as a reference, from which we can calculate drag reduction on the slippery rough surface.

The Peltier plate was maintained at a constant temperature of 23° C. in all the tests. To minimize measurement errors, the liquid meniscus at the edge of the cone was well controlled by monitoring through a macro camera maintain the constant liquid volume.

We systematically tested the lubricants with the viscosities from 72.2 cP to 988 cP. Our results show that the drag reduction on slippery rough surface is comparable to conventional superhydrophobic surfaces.

Sustainable drag reduction for marine ships requires not only drag reduction, but also anti-fouling and robust lubricant retention. Highly viscous lubricant can significantly enhance the longevity. Combined with the anti-fouling and robustness of the lubricant, such a slippery rough surface can reduce drag for marine ships or heat exchangers.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A method of preparing a slippery rough surface, the method comprising:
   texturing a surface of a substrate with a plurality of raised first elements and a plurality of second elements thereon;
   silanizing the textured surface through liquid phase silanization; and
   applying a hydrophobic and oleophilic liquid lubricant layer over the plurality of raised first elements and between the plurality of second elements to maintain a lubricant on the silanized textured surface,
   wherein the liquid lubricant layer is conformal over the plurality of raised first elements and has a uniform thickness over the plurality of raised first elements, and wherein the slippery rough surface maintains droplet mobility in a Wenzel state.

2. The method of claim 1, wherein the surface of the substrate is a metal, plastic, ceramic, glass or combination thereof.

3. The method of claim 1, wherein the plurality of second elements have an average height of between 0.01 $\mu$·m and 10 $\mu$·m.

4. The method of claim 1, wherein the plurality of raised first elements have an average height of between 0.5 $\mu$·m and 500 $\mu$·m, and wherein the plurality of second elements have an average height of between 0.01 $\mu$·m and 10 $\mu$·m.

5. The method of claim 1, wherein the surface of the substrate is a metal, plastic, ceramic, glass or combination thereof.

6. The method of claim 1, wherein the plurality of second elements have an average height of between 0.01 $\mu$·m and 10 $\mu$·m.

7. The method of claim 2, wherein the plurality of second elements have an average height of between 0.01 $\mu$·m and 10 $\mu$·m.

8. The method of claim 1, wherein the plurality of raised first elements have an average height of between 0.5 $\mu$·m and 500 $\mu$·m, and wherein the plurality of second elements have an average height of between 0.01 $\mu$·m and 10 $\mu$·m.

9. The method of claim 2, wherein the plurality of raised first elements have an average height of between 0.5 $\mu$·m and 500 $\mu$·m, and wherein the plurality of second elements have an average height of between 0.01 $\mu$·m and 10 $\mu$·m.

10. The method of claim 3, wherein the plurality of raised first elements have an average height of between 0.5 $\mu$·m and 500 $\mu$·m, and wherein the plurality of second elements have an average height of between 0.01 $\mu$·m and 10 $\mu$·m.

* * * * *